T. CASTOR.
Railway Car.
No. 27,203.
Patented Feb. 21, 1860.
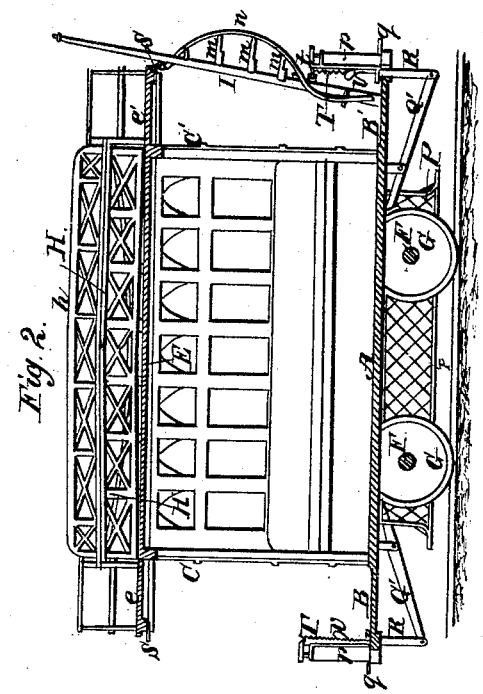
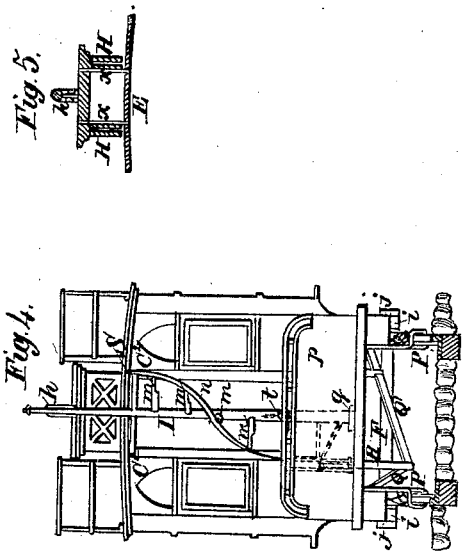
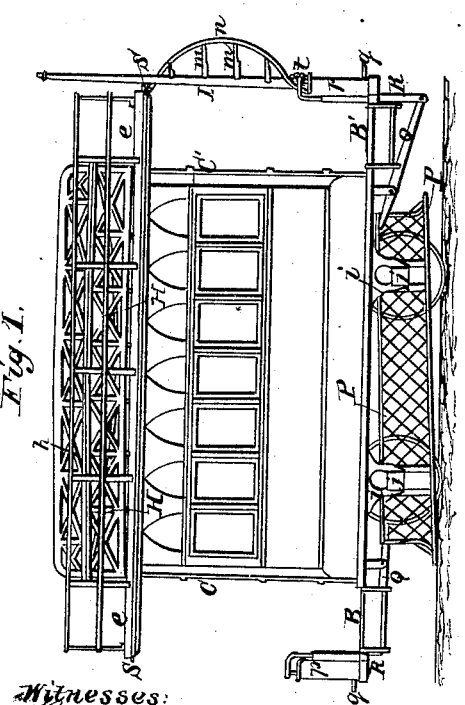
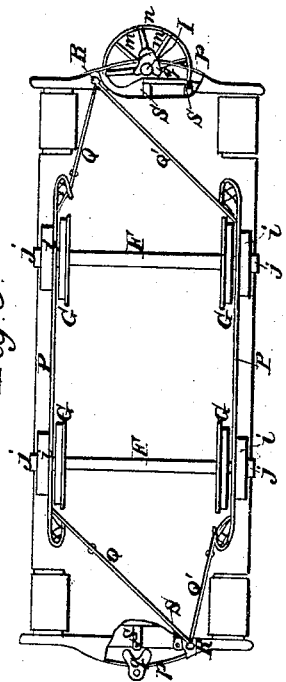

UNITED STATES PATENT OFFICE.

THOMAS CASTOR, OF PHILADELPHIA, PENNSYLVANIA.

PASSENGER RAILWAY-CAR.

Specification of Letters Patent No. 27,203, dated February 21, 1860.

*To all whom it may concern:*

Be it known that I, THOMAS CASTOR, of the city and county of Philadelphia and State of Pennsylvania, have invented certain new and useful Improvements in Passenger Railway-Cars; and I do hereby declare the following to be a full, clear, and exact description of the same, reference being had to the accompanying drawing and to the letters of reference marked thereon.

My invention relates to improvements in cars used for conveying passengers over city railroads, and my improvements consist, firstly, in a novel method of constructing the seats for the roof and applying them to and arranging them on the car, whereby the usual light materials may be used for the roof and the latter at the same time may be so strengthened as to sustain the weight of the passengers walking to and fro over the same; secondly, in a spiral ladder so applied to the car as to afford every facility for the passengers to ascend from the platform to the roof and so connected to the car as to be readily detached and applied to either one end or the other of the same; thirdly, in certain guards applied to the car and arranged in respect to the wheels substantially in the manner described hereafter so as to afford every provision against accidents to passengers ascending and descending from the platforms, the said guards being under the control of the driver who can raise them at pleasure free from any obstruction on the track.

In order to enable others skilled in the art to make and use my invention, I will now proceed to describe its construction and operation.

On reference to the accompanying drawing which forms a part of this specification, Figure 1 is a side view of a passenger railway car with my improvements; Fig. 2, a longitudinal section; Fig. 3, an inverted plan with part of the base broken away at each end; Fig. 4, an end view, and Fig. 5, a section of the seat on the roof.

Similar letters refer to similar parts throughout the several views.

A represents the base of the car, B and B' the two platforms for the driver, C and C' the opposite ends of the body furnished with suitable doors and windows, D D the opposite sides of the car having the usual sashes, E the roof, and $e$ and $e'$ the opposite overhanging ends of the roof, F F the axles furnished with the flanged wheels G G' and turning in boxes $j$ connected to the hangers $i$.

The above mentioned parts are similar to those of ordinary passenger railway cars and will require no further explanation.

On the roof of the car is erected a framework H, which consists of upper and lower chords, verticals and diagonals framed together after the manner of an ordinary truss frame girder, the framework being curved on the top and divided into two benches for the accommodation of passengers, by a truss framed back $h$. This framework, which composes the seats for the roof is furnished with longitudinal rods, or is otherwise so trussed, and is of such a length, that it is free from contact with the roof at all points excepting at its opposite ends which coincide with the opposite ends C and C' of the car body. The frame work, however, is connected to the roof at intervals by small bolts $x$, see Fig. 5, one of these bolts being, in the present instance, situated behind each vertical post of the frame on the opposite sides of the latter. By this arrangement, the whole weight of the seat, with that of the passengers, is supported by the ends of the car, and the roof is made of the usual light materials, being so supported by the above mentioned bolts that it cannot yield to the weight of the passengers walking on its surface. A suitable railing $f$ is secured to the edge of the roof as well as to the overhanging portion of the same, the said railing being discontinued at the opposite ends so as to leave openings through which the passengers can pass to the seats of the roof.

In ascending from the platforms B and B' to the roof of the car, I make use of a detachable spiral ladder composed of a single pole I extending from the platform to a suitable point above the roof. A series of "rounds" $m, m$, connected together at the end by a spiral rib $n$, are secured to this pole at a suitable distance apart and arranged spirally, the lowest round being at an appropriate height from the platform, situated within the curve of the splashboard $p$, and at right angles or thereabout to the side of the car, the highest round being situated a short distance below and parallel with the edge of the roof. The lower end of the pole I fits into a recess formed by a forked strip $q$, one of which is secured to each platform near the splashboard, as best observed on reference to the inverted plan view Fig. 3, the upper end of the ladder being furnished with two pins one of which is attached to or forms a part of the spiral rib n, the other being attached to the pole; these pins fit into the holes of the plates s s two of which are secured to each end of the car on the under side of the overhanging portions e of the roof. A pin t attached by a cord or chain to the pole, passes through projections on the latter, and through the frame of the splash board, thus securing the ladder firmly to its proper position, which is such as to afford every facility for a passenger to ascend from the platform to the roof, the pole, grasped by the hand, serving to steady him during the ascent. When the ladder has to be removed from one end of the car to the other the pin t is withdrawn from its orifice in the projections of the pole and in the frame of the splash board, the lower end of the pole moves inward from its recess in the forked plate q, as best observed on reference to Fig. 2, when the pins at the upper end of the ladder may be readily withdrawn from the orifices in the plates s s and the detached ladder removed to the opposite end of the car where it is connected by appliances similar to those on the end from which the ladder has been removed.

It will now be seen that when the horses are changed from one end of the car to the other the position of the ladder may be altered so as to accommodate the ascending or descending passengers at the opposite end to that on which the driver stands. A guard P, which in this instance consists of an iron frame with a wire netting, is arranged to slide up and down on the hangers i i one guard on each side of the car. Each guard is arranged in front of two wheels G G and is turned inward at each end as seen in Fig. 3, the opposite ends of each guard being curved, as seen in Figs. 1, and 2. The guards rest at one end on the ends of the short arms of the levers Q and Q' which have their fulcrums on the under side of the car, the opposite ends of the guards resting on similar levers situated at the opposite end of the car. The two levers Q and Q' are jointed to the vertical rod R which passes through the platform and has, above the latter a cap conveniently situated to receive the foot of the driver, who, by depressing the rod can raise the opposite guards simultaneously free from the snow or other obstruction on the track. A notched guide T is secured to each splash board for receiving the sliding spring U, the latter having two lips, by compressing which toward each other the slide will be free from the notches but which will be retained by the notches when the lips are not so compressed. This spring slide may be raised at pleasure so that the plate on the vertical rod R may bear against it and retain the guards in their elevated position without the assistance of the driver's foot.

It will be readily seen that the guard affords every protection against accidents which are apt to occur to passengers who ascend and descend from the platform without exercising due care. The guards instead of being continuous may be separated into two sets, one set for one pair of wheels and the other set for the other wheels, each set being controlled from the nearest platform by the above described appliances.

I claim as my invention and desire to secure by Letters Patent—

1. The frame H trussed and otherwise constructed substantially as set forth, combined with and connected to the roof F of the car and arranged on the same in respect to the opposite ends, C and C' of the car as and for the purpose herein set forth.

2. I claim the detachable spiral ladder composed of the pole I its "rounds" m and connecting rib n when the said ladder is arranged in respect to the platform B or B' and overhanging portions e or e' of the roof and connected to the same substantially in the manner specified.

3. I claim the guards P P constructed and applied to the car substantially as set forth when the said guards are arranged to be controlled by the foot of the driver through the medium of the vertical rods R and the levers Q and Q' or their equivalents as set forth for the purpose specified.

In testimony whereof, I have signed my name to this specification, in the presence of two subscribing witnesses.

THOS. CASTOR.

Witnesses:
 HENRY HOWSON,
 ISRAEL L. ELLIOTT.